UNITED STATES PATENT OFFICE.

SOLOMON H. GOLDBERG, OF CHICAGO, ILLINOIS.

PROCESS OF RETREADING TIRES.

1,336,624.  Specification of Letters Patent.  Patented Apr. 13, 1920.

No Drawing.  Application filed May 23, 1919. Serial No. 299,138.

*To all whom it may concern:*

Be it known that I, SOLOMON H. GOLDBERG, a citizen of the United States, residing in the city of Chicago, county of Cook, and State of Illinois, have invented certain new and useful Improvements in Processes of Retreading Tires, of which the following is a specification.

This invention relates to improvements in process of retreading tires and has among its salient objects to provide an improved process in which the tread is securely fixed to the body of the tire and vulcanized thereto; to provide a process of the character referred to in which the old body or carcass is reinforced by means of an inter-liner which is in turn vulcanized to the tire; to provide a process of the character referred to in which the parts to be treated are so assembled together as to insure a uniform vulcanization; to provide a process in which the tire during the process of vulcanization is subjected to constantly uniformly increasing pressure; to provide a process in which the parts being vulcanized are treated with a novel and improved form of rubber cement and in general to provide a process of the character referred to.

Describing now the method of carrying out my improved process—the old tread is removed from the tire and the outer surface scraped, cleaned and buffed. The fabric is then dried by placing it in an oven at a low temperature, say 150 to 180° F. To the outer and inner periphery of the clean carcass is then applied a rubber cement. This rubber cement or rubber solution may consist of say 10 per cent. rubber and 90 per cent. benzol having an 80 centigrade end point, to which is added sufficient sulfur to vulcanize properly.

After the solution above referred to has been applied to the inner and outer periphery of the tire it is then dried at suitable temperature. A reliner as a novel feature of the invention is then inserted in the inner periphery of the carcass. This reliner may consist of two ply rubberized fabric impregnated with a hydrocarbon solution, as for example the rubber cement above referred to. This reliner is put in to strengthen the tire and make it more puncture proof. The rubber solution with which the fabric is impregnated should also be provided with a vulcanizing agent.

There is now inserted into the carcass a reinforced air bag which is partially inflated and adapted to be mounted on a rim. The method of producing this air bag forms a separate invention, but it may be noted that the air bag consists essentially of a reinforced inner rubber tube which can be inflated with air. There is now applied to the outer periphery of the carcass two layers of thin rubber ply which are separated from each other by a breaker strip. This breaker strip consists of fabric impregnated with a rubber cement, such as the solution previously referred to; it is obvious of course that this solution contains a vulcanizing agent. I then apply this same rubber cement to the inner side of a new tread which is to be applied to the tire. This tread it is to be noted may be of any desired exterior configuration as for example, smooth tread or non-skid, which is properly adjusted on the tire body so as to set in proper position. After the tread has been applied to the tire it is desirable to remove all the air bubbles which may be done by puncturing the tread and subjecting it to pressure on the tire body.

To the tread and side walls of the tire is then applied a matrix which may consist of 50 per cent. finely powdered soap stone and 50 per cent. water. This matrix is applied so as to fill all the interstices and cavities and obtain a solid packing to insure of uniform heating and pressure. The materials of which this matrix is made forms no part of the present invention and other forms of matrix may be used in the broader scope of the invention.

The parts so assembled are now wrapped with a wet fabric or bandage so as to obtain a solid ring. These bandages extend around both the tire and rim and are preferably wrapped spirally, the turns of the fabric overlapping. When the air bag was first inserted it was preferably inflated to about twenty pounds, but it is now increased to forty pounds. The tire is then put into an oven and left there from one to three hours, which oven is heated to 300° F. more or less. The tire is preferably rotated in the hot oven so as to get a uniform pressure and heating.

As an additional feature of the invention and an important one, I have discovered that the carcass or body may be strengthened before the tread is applied. To this end, after the outer periphery has been coated with a rubber cement, such as above referred to, and while it is still wet I apply a comminuted fibrous material such as shredded asbestos for example, and then while still wet I apply the breaker strip to the carcass. When the parts are vulcanized together, the fiber unites partly with the body and partly with the breaker strip to produce a reinforced bond between the carcass and breaker strip.

I claim as my invention:

A process of building up a tire consisting in applying a rubber cement containing a vulcanizing agent to the outer periphery of a tire body and while the solution is still wet applying comminuted fibrous material thereto, applying a breaker strip and then the tread, said breaker strip and tread having been treated with a rubber cement containing a vulcanizing agent, securing the parts together and vulcanizing them whereby a reinforced fabric is obtained between the breaker strip and tire body.

SOLOMON H. GOLDBERG.